(12) United States Patent
Xiao et al.

(10) Patent No.: US 12,038,658 B2
(45) Date of Patent: Jul. 16, 2024

(54) ARRAY SUBSTRATE AND DISPLAY PANEL (71) Applicant: TCL China Star Optoelectronics Technology Co., Ltd., Guangdong (CN)

(72) Inventors: Juncheng Xiao, Guangdong (CN); Ji Li, Guangdong (CN); Fen Long, Guangdong (CN); Yingchun Zhao, Guangdong (CN); Ru Ge, Guangdong (CN); Yun Yu, Guangdong (CN); Jing Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/614,394

(22) PCT Filed: Nov. 5, 2021

(86) PCT No.: PCT/CN2021/128894
§ 371 (c)(1),
(2) Date: Nov. 26, 2021

(87) PCT Pub. No.: WO2023/070726
PCT Pub. Date: May 4, 2023

(65) Prior Publication Data
US 2024/0027856 A1    Jan. 25, 2024

(30) Foreign Application Priority Data
Oct. 27, 2021 (CN) .......................... 202111257983.3

(51) Int. Cl.
*G02F 1/1362* (2006.01)
*G02F 1/1368* (2006.01)

(52) U.S. Cl.
CPC .... *G02F 1/136286* (2013.01); *G02F 1/13624* (2013.01); *G02F 1/1368* (2013.01)

(58) Field of Classification Search
CPC ........... G02F 1/136286; G02F 1/13624; G02F 1/1368
See application file for complete search history.

(56) References Cited

U.S. PATENT DOCUMENTS

| 2012/0138932 A1 | 6/2012 | Lin et al. |
| 2016/0202582 A1 | 7/2016 | Paek et al. |
| 2020/0004089 A1 | 1/2020 | Ho et al. |

FOREIGN PATENT DOCUMENTS

| CN | 101059629 | 10/2007 |
| CN | 101090095 | 12/2007 |

(Continued)

OTHER PUBLICATIONS

English machine translation for CN 101090095A (Year: 2007).*
Notice of Reasons for Rejection Dated Dec. 26, 2023 From the Japan Patent Office Re. Application No. 2021-568264. (6 Pages).

(Continued)

*Primary Examiner* — Anne M Hines (57) ABSTRACT

The present application relates to an array substrate and a display panel. According to the present application, a first sharing line is correspondingly disposed under the data line, an electric field of the data line is shielded through the first sharing line, a coupling effect between the data line and a first common line is reduced through the first sharing line, a crosstalk caused to the data line due to fluctuation of the first common line is reduced, and a problem in the prior art of using a common electrode line to shield a lateral electric field of the data line, resulting in a low aperture ratio of a display panel, is prevented.

16 Claims, 7 Drawing Sheets

(56) References Cited

FOREIGN PATENT DOCUMENTS

| | | |
|---|---|---|
| CN | 201876642 | 6/2011 |
| CN | 102184966 | 9/2011 |
| CN | 110824795 | 2/2020 |
| CN | 110928084 | 3/2020 |
| CN | 110931512 | 3/2020 |
| CN | 113485051 | 10/2021 |
| CN | 110837195 | 2/2022 |
| CN | 111474780 | 7/2022 |
| JP | 2014-146021 | 8/2014 |
| KR | 10-2011-0089915 | 8/2011 |
| WO | WO 2021/184431 | 9/2021 |

OTHER PUBLICATIONS

Notice of Submission of Opinion Dated Nov. 21, 2023 From the Korean Intellectual Property Office Re. Application No. 10-2021-7039244 and Its Translation Into English. (8 Pages).

* cited by examiner

ARRAY SUBSTRATE AND DISPLAY PANEL

RELATED APPLICATIONS

This application is a National Phase of PCT Patent Application No. PCT/CN2021/128894 having International filing date of Nov. 5, 2021, which claims the benefit of priority of Chinese Patent Application No. 202111257983.3 filed on Oct. 27, 2021. The contents of the above applications are all incorporated by reference as if fully set forth herein in their entirety.

FIELD AND BACKGROUND OF THE INVENTION

The present disclosure relates to a field of display technology, in particular to an array substrate and a display panel.

At present, in an array substrate of a thin film transistor liquid crystal display (TFT LCD), an electric field of a data line may cause surrounding liquid crystals to flip, resulting in light leakage. Moreover, a distance between the data line and a pixel electrode is relatively short, thus a capacitive coupling of the data line to the pixel electrode may cause adverse effects such as crosstalk.

At present, in addition to providing a black matrix (BM) above the data line for light shielding, a data line BM less (DBS) technique may be used to remove the black matrix above the data line, and a DBS electrode may be provided above the data line, so that a potential of the DBS electrode is same as a potential of a common electrode on a color film substrate, so that corresponding liquid crystal molecules above the data line remain in an undeflected state at all times, thereby performing light shielding.

Figure 1:
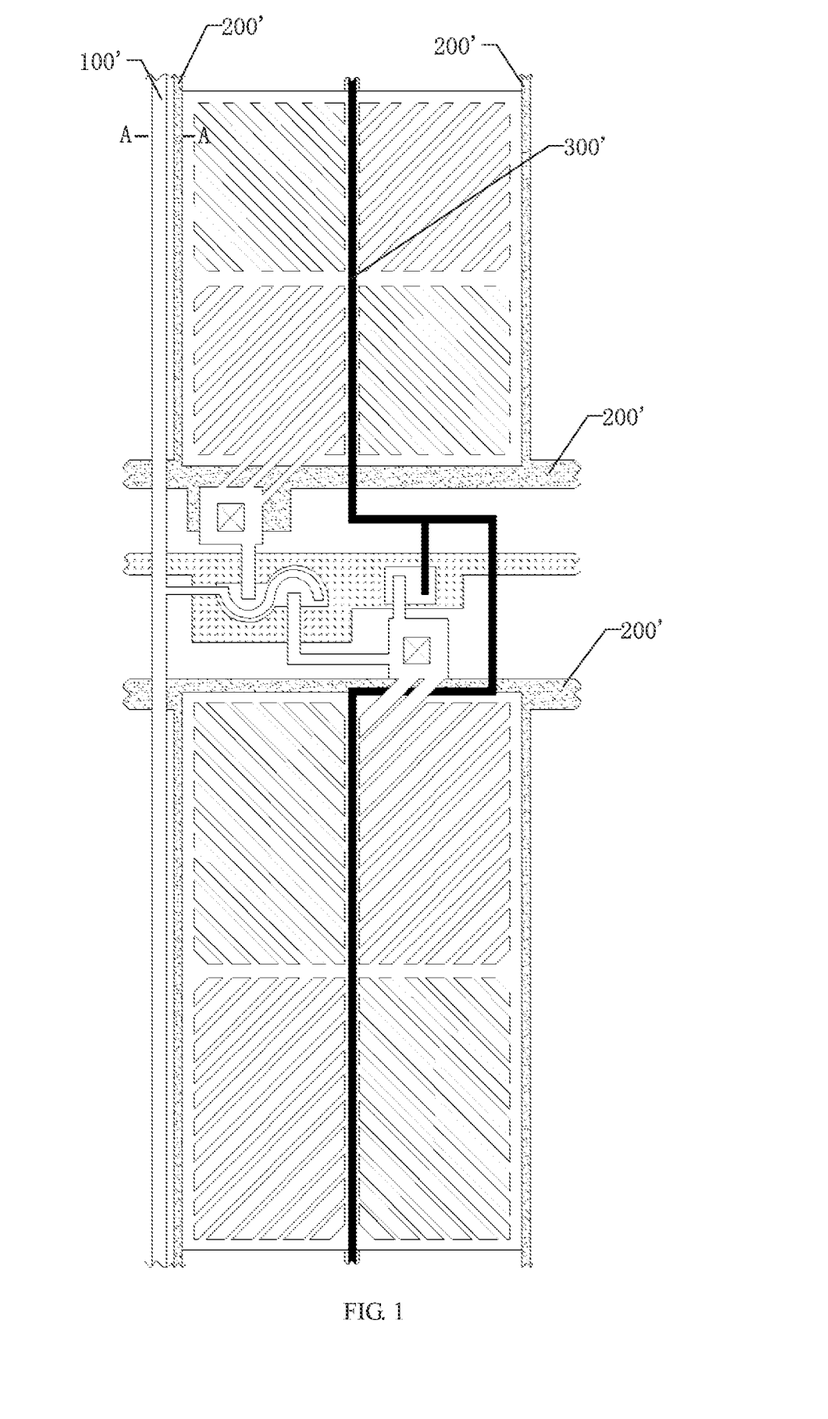
FIG. 1 is a schematic plan view of a pixel unit of an array substrate in the prior art.
Figure 2:
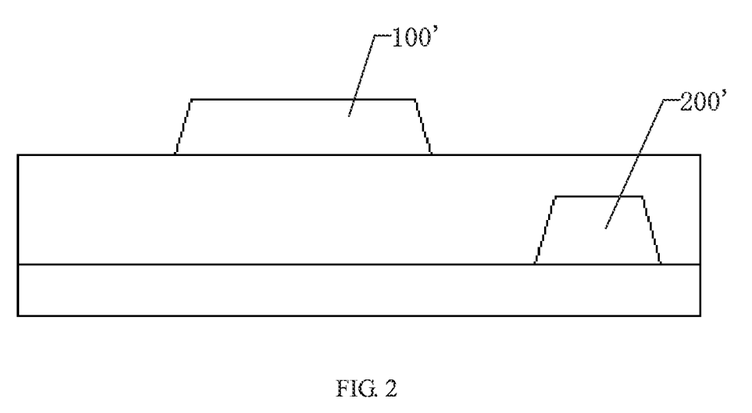
FIG. 2 is a cross-sectional view of A-A in FIG. 1.

As shown in FIGS. 1 and 2, a common electrode line 200' (A com) may be used on a side of a data line 100' to shield a lateral electric field of the data line 100', so as to reduce an influence of the data line to a pixel electrode. However, using the common electrode line 200' to shield the lateral electric field of the date line 100' will reduce an aperture ratio of a pixel unit. Further, a sharing electrode line 300' (share bar) of a sharing thin film transistor penetrates a main pixel region and a sub-pixel region vertically, thereby reducing a light transmission area of the pixel unit and reducing the aperture ratio and a transmittance of the pixel unit.

SUMMARY OF THE INVENTION

The present disclosure aims to provide an array substrate and a display panel, which can solve problems in the prior art that using a common electrode line to shield a lateral electric field of a data line may cause a low aperture ratio of a display panel.

To solve the above problems, the present disclosure provides an array substrate, comprising a substrate and a plurality of pixel units arranged on the substrate in array; each of the pixel units comprises: a data line disposed on the substrate; a scan line disposed on the substrate and intersecting with the data line; and a first sharing line disposed between the substrate and the data line and parallel to the data line.

In addition, the first sharing line has a first central axis parallel to the data line; the data line has a second central axis parallel to the first sharing line; and the first central axis and the second central axis coincide with each other.

In addition, a width of the first sharing line and a width of the data line are uniformly set, and the width of the first sharing line is greater than or equal to the width of the data line.

In addition, each of the pixel units is divided into a main pixel region and a sub-pixel region, and the scan line is disposed between the main pixel region and the sub-pixel region; each of the pixel units further comprises: a second sharing line parallel to the scan line and disposed between the scan line and the sub-pixel region; and a first common line parallel to the scan line and disposed between the scan line and the main pixel region; wherein one end of the first sharing line is electrically connected to the second sharing line, and another end of the first sharing line extends along the first axis from the sub-pixel region of one of the pixel units to the main pixel region of an adjacent pixel unit.

In addition, the scan line, the second sharing line, the first common line, and the first sharing line are disposed in a same layer.

In addition, each of the pixel units further comprises: a main pixel electrode disposed in the main pixel region, wherein the main pixel electrode comprises a first main electrode parallel to the data line; a sub-pixel electrode disposed in the sub-pixel region, wherein the sub-pixel electrode comprises a second main electrode parallel to the data line; a main pixel thin film transistor, wherein a gate of the main thin film transistor is electrically connected to the scan line, a source of the main thin film transistor is electrically connected to the data line, and a drain of the main thin film transistor is electrically connected to the main pixel electrode; a sub-pixel thin film transistor, wherein a gate of the sub-pixel thin film transistor is electrically connected to the scan line, a source of the sub-pixel thin film transistor is electrically connected to the data line, and a drain of the sub-pixel thin film transistor is electrically connected to the sub-pixel electrode; and a sharing thin film transistor, wherein a gate of the sharing thin film transistor is electrically connected to the scan line, a source of the sharing thin film transistor is electrically connected to the drain of the sub-pixel thin film transistor, and a drain of the sharing thin film transistor is electrically connected to the second sharing line.

In addition, each of the pixel units further comprises: a third sharing line, wherein one end of the third sharing line is electrically connected to the second sharing line and another end of the third sharing line extends along the first axis from the sub-pixel region of one of the pixel units to the main pixel region of an adjacent pixel unit.

In addition, each of the pixel units further comprises: a second common line, one end of the second common line is electrically connected to the first common line and another end of the second common line extends along the first axis from the main pixel region of one of the pixel units to the sub-pixel region of an adjacent pixel unit.

In addition, the third sharing line in the main pixel region is disposed corresponding to the first main electrode, and the third sharing line in the sub-pixel region is disposed corresponding to the second main electrode.

In addition, the second common line in the main pixel region is disposed corresponding to the first main electrode, and the second common line in the sub-pixel region is disposed corresponding to the second main electrode.

In order to solve the above problems, the present disclosure provides a display panel, comprising an array substrate according to the present disclosure, a color film substrate disposed corresponding to the array substrate, and a liquid crystal layer disposed between the array substrate and the color film substrate.

In the present application, the first sharing line is correspondingly disposed under the data line, an electric field of the data line is shielded through the first sharing line, coupling between the data line and the first common line is relieved through the first sharing line, a crosstalk caused to the data line due to fluctuation of the first common line is reduced, and a problem in the prior art that using a common electrode line to shield a lateral electric field of the data line causes a low aperture ratio of a display panel is prevented. In the present disclosure, the first central axis of the first sharing line and the second central axis of the data line coincide with each other, thereby preventing a situation in the prior art that the first sharing line penetrates the main pixel region and the sub-pixel region vertically, and thereby improving an aperture ratio and transmittance of the pixel units.

BRIEF DESCRIPTION OF THE SEVERAL VIEWS OF THE DRAWINGS

In order to more clearly explain technical solutions in embodiments of the present disclosure, the following will briefly introduce drawings required in the description of the embodiments. Obviously, the drawings in the following description are only some embodiments of the present disclosure. For those skilled in the art, without paying any creative work, other drawings can be obtained based on these drawings.

REFERENCE NUMERALS 100, array substrate; 101, substrate;
102, pixel unit;
1021, main pixel region; 1022, sub-pixel region;
1, data line; 2, scan line;
3, first sharing line; 4, second sharing line;
5, first common line; 6, main pixel electrode;
7, sub-pixel electrode; 8, main pixel thin film transistor;
9, sub-pixel thin film transistor; 10, sharing thin film transistor;
11, third sharing line; 12, first central axis;
13, second central axis; 14, insulating layer;
15, second common line; 61, first main electrode;
71, second main electrode.

DESCRIPTION OF SPECIFIC EMBODIMENTS OF THE INVENTION

The following describes preferred embodiments of the present disclosure in detail with reference to accompanying drawings of the specification, to fully introduce technical contents of the present disclosure to those skilled in the art, to exemplify that the present disclosure can be practiced, so that the technical contents disclosed by the present disclosure is clearer, and those skilled in the art can more easily understand how to implement the present disclosure. However, the present disclosure can be embodied by many different forms of embodiments, the protection scope of the present disclosure is not limited to the embodiments mentioned here, and the description of the following embodiments is not intended to limit the scope of the present disclosure.

Directional terms mentioned in the present disclosure, such as [up], [down], [front], [back], [left], [right], [inner], [outer], [side], etc., are only directions of the attached drawings. The directional terms used in the present disclosure are used to describe and understand the present disclosure, rather than to limit the protection scope of the present disclosure.

In the drawings, elements of a same structure are denoted by a same numeral and components of similar structure or function are denoted by similar numerals. Further, for ease of understanding and description, dimensions and thickness of each component shown in the drawings are arbitrarily shown, and the present disclosure does not limit the dimensions and thickness of each component.

Embodiment 1

This embodiment provides a display panel. The display panel comprises an array substrate 100, a color film substrate disposed corresponding to the array substrate 100, and a liquid crystal layer disposed between the array substrate 100 and the color film substrate.

Figure 3:
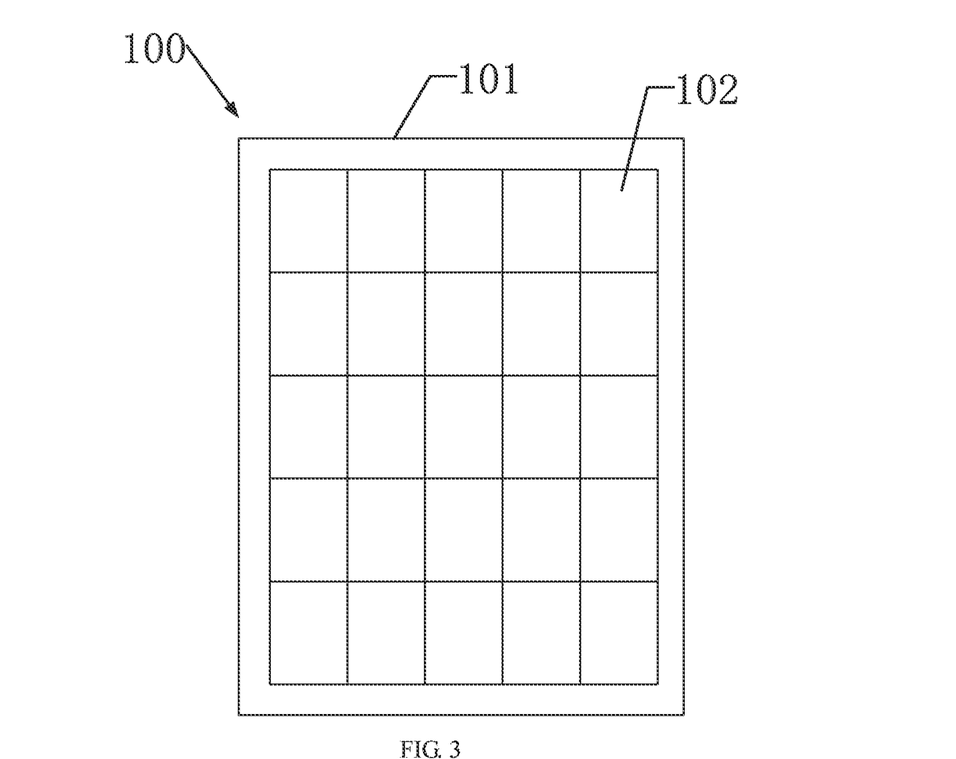
FIG. 3 is a schematic plan view of an array substrate according to Embodiment 1 of the present disclosure.

As shown in FIG. 3, the array substrate 100 comprises a substrate 101 and a plurality of pixel units 102 arranged on the substrate 101 in array.

The substrate 101 is made of one or more of glass, polyimide, polycarbonate, polyethylene terephthalate, and polyethylene naphthalate. Therefore, the substrate 101 has better impact resistance and can effectively protect the display panel.

Figure 4:
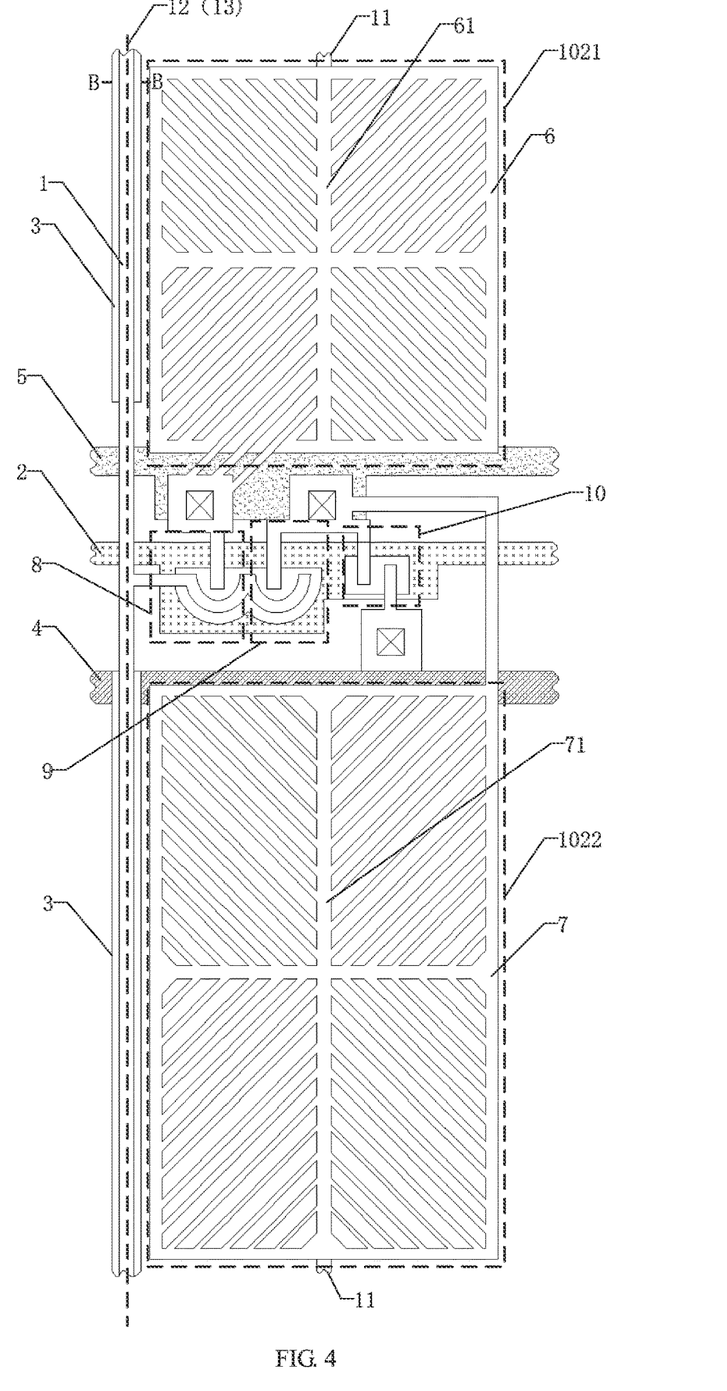
FIG. 4 is a schematic plan view of a pixel unit of the array substrate according to Embodiment 1 of the present disclosure.

As shown in FIG. 4, each of the pixel units 102 is divided into a main pixel region 1021 and a sub-pixel region 1022. Each of the pixel units 102 comprises a data line 1, a scan line 2, a first sharing line 3, a second sharing line 4, a first common line 5, a main pixel electrode 6, a sub-pixel electrode 7, a main pixel thin film transistor 8, a sub-pixel thin film transistor 9, a sharing thin film transistor 10, and a third sharing line 11.

Figure 5:
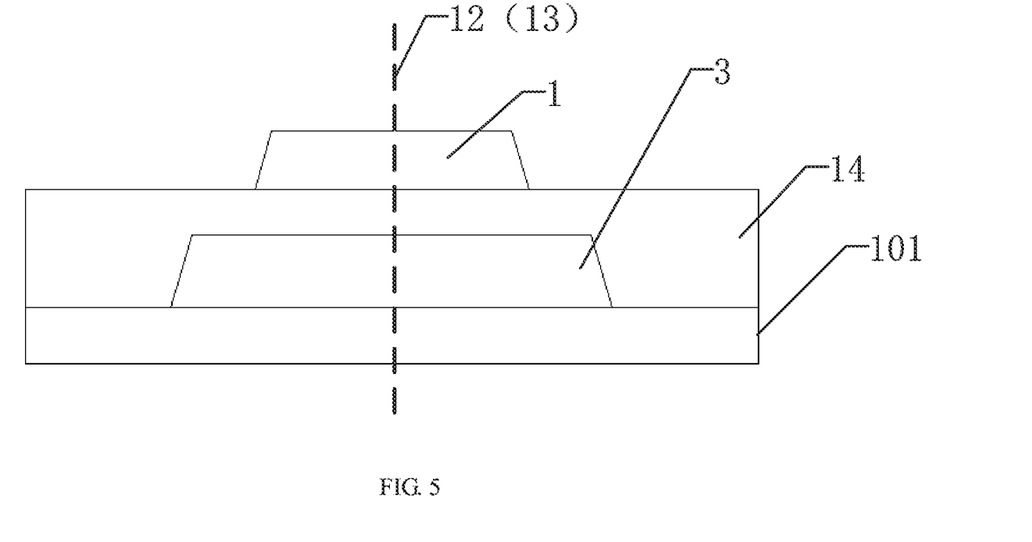
FIG. 5 is a cross-sectional view of B-B in FIG. 4.

As shown in FIGS. 3, 4, and 5, the data line 1 is disposed on the substrate 101. In this embodiment, a material of the data line 1 is metal. In other embodiments, materials of the data line 1 may also be other conductive materials. For example, alloys, nitrides of metallic materials, oxides of metallic materials, nitrogen oxides of metallic materials, stacked layers of metallic materials and other conductive materials, or other suitable materials.

As shown in FIGS. 3 and 4, the scan line 2 is disposed between the main pixel region 1021 and the sub-pixel region 1022, and intersects with the data line 1. That is, an extension direction of the data line 1 is not parallel to an extension direction of the scan line 2. In this embodiment, the extension direction of the data line 1 and the extension direction of the scan line 2 are perpendicular to each other. In this embodiment, a material of the scan line 2 is metal. In other embodiments, materials of the scan line 2 may also be other conductive materials. For example, alloys, nitrides of metallic materials, oxides of metallic materials, nitrogen oxides of metallic materials, stacked layers of metallic materials and other conductive materials, or other suitable materials.

As shown in FIGS. 3, 4 and 5, the first sharing line 3 is disposed between the substrate 101 and the data line 1, and parallel to the data line 1. In this embodiment, a material of the first sharing line 3 is metal. In other embodiments, materials of the first sharing line 3 may also be other conductive materials. For example, alloys, nitrides of metallic materials, oxides of metallic materials, nitrogen oxides of metallic materials, stacked layers of metallic materials and other conductive materials, or other suitable materials.

An electric field of the data line 1 is shielded by the first sharing line 3, and a coupling effect between the data line 1 and the first common line 5 is relieved by the first sharing line 3, thereby reducing crosstalk to the data line 1 by fluctuation of the first common line 5. A problem in the prior art, of using a common electrode line to shield a lateral electric field of a data line, resulting in a low aperture ratio of the display panel, is prevented.

As shown in FIGS. 3, 4 and 5, the first sharing line 3 has a first central axis 12 parallel to the data line 1, and the first central axis 12 is a symmetrical axis. The data line 1 has a second central axis 13 parallel to the first sharing line 3, and the second central axis 13 is a symmetrical axis. The first central axis 12 and the second central axis 13 coincide with each other. The first central axis 12 of the first sharing line 3 coincides with the second central axis 13 of the data line 1 to prevent a situation in the prior art that the first sharing line 3 penetrates the main pixel region 1021 and the sub-pixel region 1022 vertically, thereby increasing an aperture ratio and transmittance of the array substrate 100.

Figure 7:
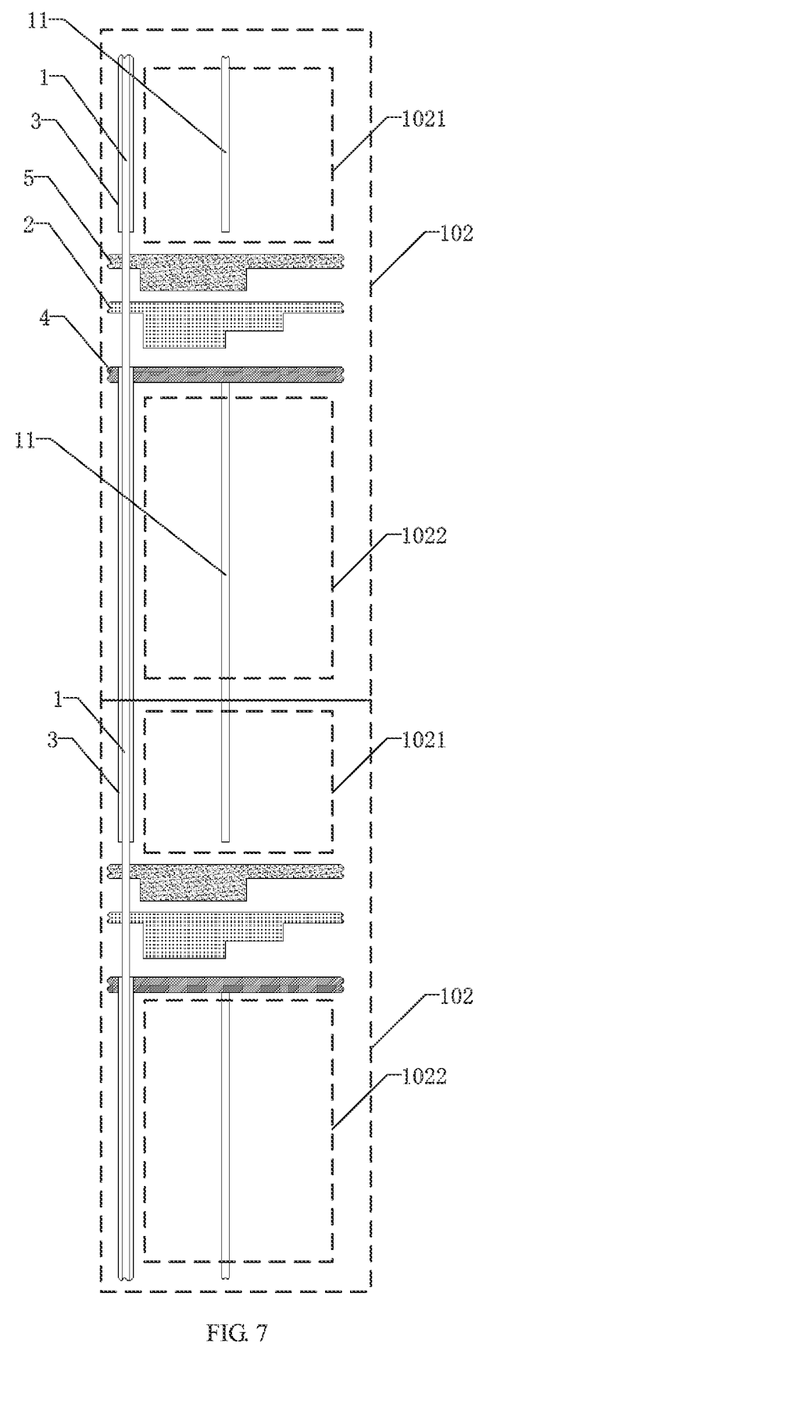
FIG. 7 is a schematic partial plan view of two pixel units of the array substrate according to Embodiment 1 of the present disclosure.

As shown in FIG. 7, one end of the first sharing line 3 is electrically connected to the second sharing line 4, and another end extends along the first central axis from the sub-pixel region 1022 of one of the pixel units 102 to the main pixel region 1021 of an adjacent pixel unit 102.

As shown in FIGS. 4 and 5, a width of the first sharing line 3 is uniformly set, a width of the data line 1 is uniformly set, and the width of the first sharing line 3 is greater than or equal to the width of the data line 1. Specifically, a difference value between the width of the first sharing line 3 and the width of the data line 1 ranges from 0 µm to 15 µm. When the difference value between the width of the first sharing line 3 and the width of the data line 1 is relatively small, an effect of shielding the electric field of the data line 1 by the first sharing line 3 is poor. When the difference value between the width of the first sharing line 3 and the width of the data line 1 is greater than 15 µm, the first sharing line 3 will occupy an aperture area of the array substrate 100, and the aperture ratio and transmittance of the array substrate 100 is reduced.

As shown in FIG. 5, an insulating layer 14 is also disposed between the first sharing line 3 and the data line 1. The insulating layer 14 is mainly used to prevent contact between the first sharing line 3 and the data line 1 from causing a short circuit phenomenon. Materials of the insulating layer 14 may be one or more of $SiO_2$ and $SiN_x$.

As shown in FIGS. 3 and 4, the second sharing line 4 parallels to the scan line 2 and disposed between the scan line 2 and the sub-pixel region 1022, and spacedly disposed from the scan line 2. In this embodiment, a material of the second sharing line 4 is metal. In other embodiments, materials of the second sharing line 4 may also be other conductive materials. For example, alloys, nitrides of metallic materials, oxides of metallic materials, nitrogen oxides of metallic materials, stacked layers of metallic materials and other conductive materials, or other suitable materials.

As shown in FIGS. 3 and 4, the first common line 5 parallels to the scan line 2 and disposed between the scan line 2 and the main pixel region 1021, and spacedly disposed from the scan line 2. In this embodiment, a material of the first common line 5 is metal. In other embodiments, materials of the first common line 5 may also be other conductive materials. For example, alloys, nitrides of metallic materials, oxides of metallic materials, nitrogen oxides of metallic materials, stacked layers of metallic materials and other conductive materials, or other suitable materials.

Wherein, the scan line 2, the second sharing line 4, the first common line 5, and the first sharing line 3 are disposed in a same layer. In this embodiment, the scan line 2, the second sharing line 4, the first common line 5, and the first sharing line 3 are made of a same material, so that the scan line 2, the second sharing line 4, the first common line 5, and the first sharing line 3 can be simultaneously prepared in one step, thereby saving processes and production costs.

As shown in FIG. 4, the main pixel electrode 6 is disposed in the main pixel region 1021. The main pixel electrode 6 comprises a first main electrode 61 parallel to the data line 1.

As shown in FIG. 4, the sub-pixel electrode 7 is disposed in the sub-pixel region 1022. The sub-pixel electrode 7 comprises a second main electrode 71 parallel to the data line 1.

Figure 6:
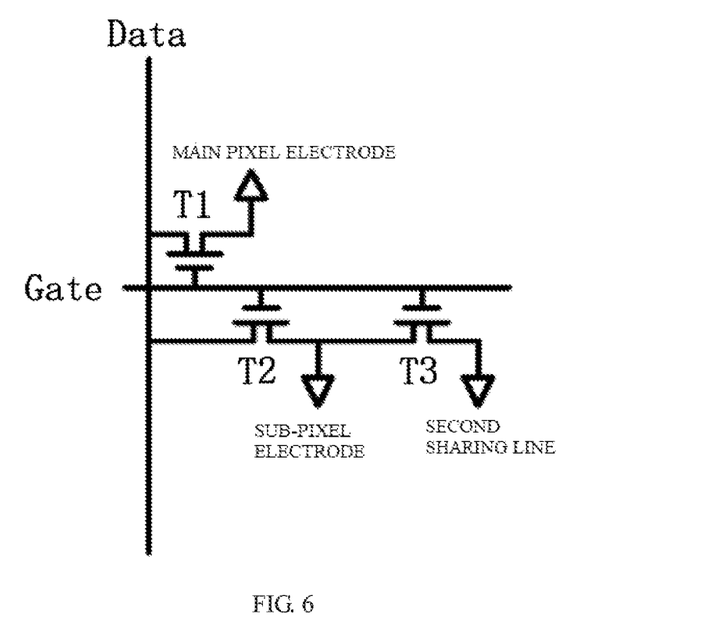
FIG. 6 is a driving circuit diagram of the array substrate according to Embodiment 1 of the present disclosure.

As shown in FIGS. 4 and 6, a gate of the main pixel thin film transistor 8 (i.e., T1 in FIG. 4) is electrically connected to the scan line 2 (i.e., Gate in FIG. 4), a source of the main pixel thin film transistor 8 (i.e., T1 in FIG. 4) is electrically connected to the data line 1 (i.e., Data in FIG. 4), and a drain of the main pixel thin film transistor 8 (i.e., T1 in FIG. 4) is electrically connected to the main pixel electrode 6.

As shown in FIGS. 4 and 6, a gate of the sub-pixel thin film transistor 9 (i.e., T2 in FIG. 4) is electrically connected to the scan line 2 (i.e., Gate in FIG. 4), a source of the sub-pixel thin film transistor 9 (i.e., T2 in FIG. 4) is electrically connected to the data line 1 (i.e., Data in FIG. 4), and a drain of the sub-pixel thin film transistor 9 (i.e., T2 in FIG. 4) is electrically connected to the sub-pixel electrode 7.

As shown in FIGS. 4 and 6, a gate of the sharing thin film transistor 10 (i.e., T3 in FIG. 4) is electrically connected to the scan line 2 (i.e., Gate in FIG. 4), a source of the sharing thin film transistor 10 (i.e., T3 in FIG. 4) is electrically connected to the drain of the sub-pixel thin film transistor 9 (i.e., T2 in FIG. 4), and a drain of the sharing thin film transistor 10 (i.e., T3 in FIG. 4) is electrically connected to the second sharing line 4.

Wherein the gate of the main pixel thin film transistor 8, the gate of the sub-pixel thin film transistor 9, and the gate of the sharing thin film transistor 10 are electrically connected to the same scan line 2. The source of the main pixel thin film transistor 8 and the source of the sub-pixel thin film transistor 9 are electrically connected to the same data line 1.

As shown in FIG. 7, one end of the third sharing line 11 is electrically connected to the second sharing line 4, and another end extends along the first central axis from the sub-pixel region 1022 of one of the pixel units 102 to the main pixel region 1021 of an adjacent pixel unit 102.

As shown in FIG. 4, the third sharing line 11 in the main pixel region 1021 disposed corresponding to the first main electrode 61, and the third sharing line 11 in the sub-pixel region 1022 disposed corresponding to the second main electrode 71. Therefore, an additional occupation of the transmission area of the array substrate 100 is prevented, and the aperture ratio of the array substrate 100 is increased.

Embodiment 2

Figure 8:
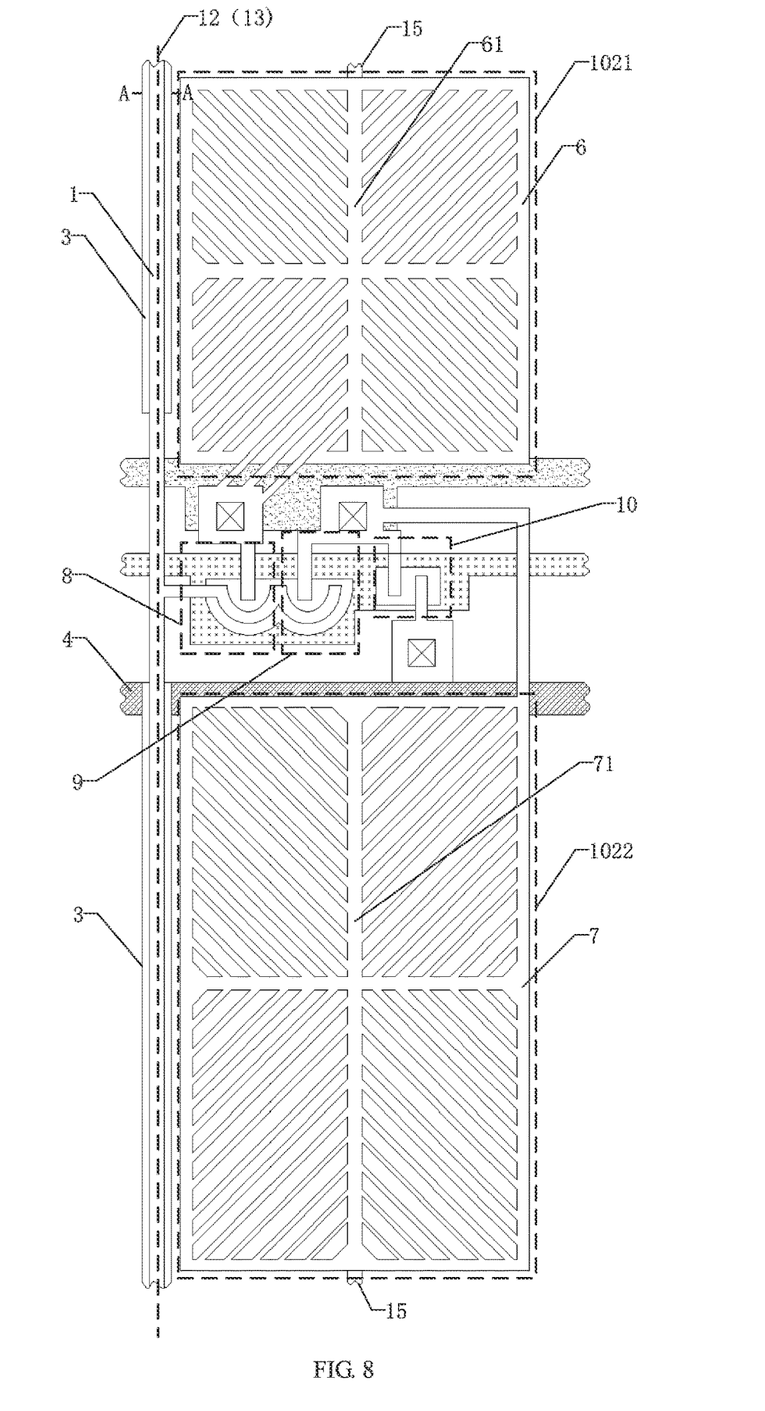
FIG. 8 is a schematic plan view of a pixel unit of an array substrate according to Embodiment 2 of the present disclosure.
Figure 9:
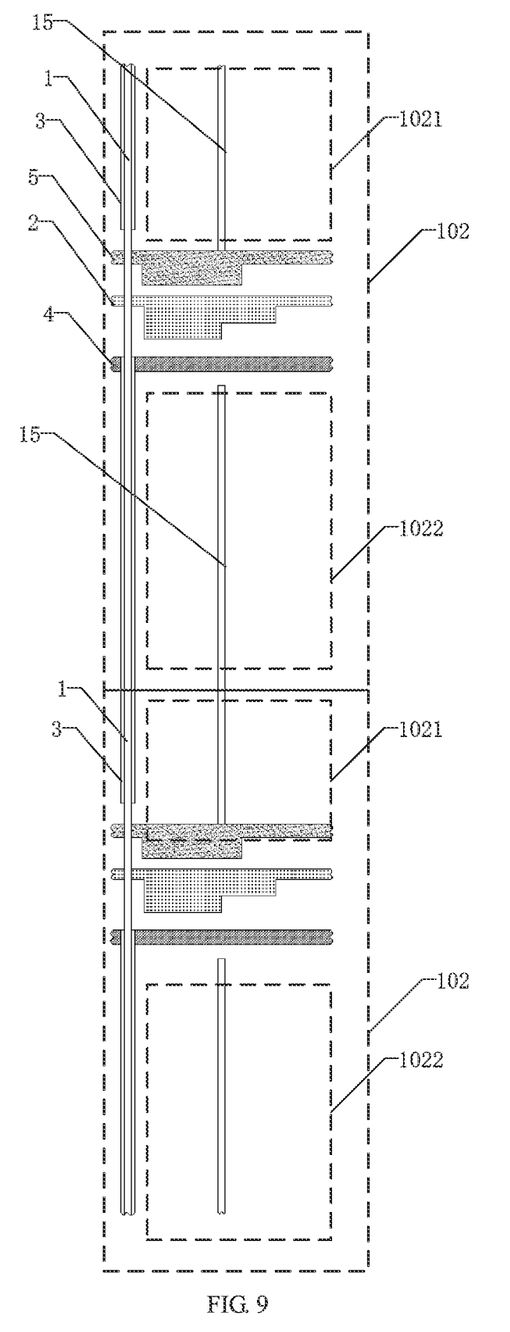
FIG. 9 is a schematic partial plan view of two pixel units of the array substrate according to Embodiment 2 of the present disclosure.

As shown in FIGS. 8 and 9, Embodiment 2 includes most technical features of Embodiment 1. Embodiment 2 differs from Embodiment 1 in that the third sharing line 11 of Embodiment 1 is removed from Embodiment 2, and a second common line 15 is disposed at a position of the third sharing line 11 of Embodiment 1.

As shown in FIGS. 8 and 9, one end of the second common line 15 is electrically connected to the first common line 5, and another end of the second common line 15 extends along the first central axis from the main pixel region 1021 of one of the pixel units 102 to the sub-pixel region 1022 of an adjacent pixel unit 102.

As shown in FIG. 8, the second common line 15 in the main pixel region 1021 is disposed corresponding to the first main electrode 61, and the second common line 15 in the sub-pixel region 1022 corresponds to the second main electrode 71. Therefore, an additional occupation of the transmission area of the array substrate 100 is prevented, and the aperture ratio of the substrate 100 is increased.

The electric field of the data line 1 is shielded by the first sharing line 3, and a coupling effect between the data line 1 and the first common line 5 is relieved by the first sharing line 3, thereby reducing crosstalk caused to the data line 1 by fluctuation of the first common line 5. The first central axis 12 of the first sharing line 3 coincides with the second central axis 13 of the data line 1 to prevent a situation in the prior art that the first sharing line 3 penetrates the main pixel region 1021 and the sub-pixel region 1022 vertically, thereby increasing the aperture ratio and the transmittance of the array substrate 100.

The above is a detailed introduction to the array substrate and the display panel provided by the present disclosure. Specific examples are used in this article to describe principles and implementations of the present disclosure. The description of the above embodiments is only used to help understand methods and core ideas of the present disclosure. At the same time, for those skilled in the art, according to the ideas of the present disclosure, changes can be made in specific implementations and scope of application. In summary, the content of this specification should not be understood as a limit to the present disclosure.

What is claimed is:

1. An array substrate, comprising a substrate and a plurality of pixel units arranged on the substrate in array;
   each of the pixel units comprises:
   a data line disposed on the substrate;
   a scan line disposed on the substrate and intersecting with the data line; and
   a first sharing line disposed between the substrate and the data line and parallel to the data line,
   wherein the first sharing line has a first central axis parallel to the data line; the data line has a second central axis parallel to the first sharing line; and the first central axis and the second central axis coincide with each other.

2. The array substrate according to claim 1, wherein a width of the first sharing line and a width of the data line are uniformly set, and the width of the first sharing line is greater than or equal to the width of the data line.

3. The array substrate according to claim 1, wherein each of the pixel units is divided into a main pixel region and a sub-pixel region, and the scan line is disposed between the main pixel region and the sub-pixel region;
   each of the pixel units further comprises:
   a second sharing line parallel to the scan line and disposed between the scan line and the sub-pixel region; and
   a first common line parallel to the scan line and disposed between the scan line and the main pixel region;
   wherein one end of the first sharing line is electrically connected to the second sharing line, and another end of the first sharing line extends along the first central axis from the sub-pixel region of one of the pixel units to the main pixel region of an adjacent pixel unit.

4. The array substrate according to claim 3, wherein the scan line, the second sharing line, the first common line, and the first sharing line are disposed in a same layer.

5. The array substrate according to claim 3, wherein each of the pixel units further comprises:
   a main pixel electrode disposed in the main pixel region, wherein the main pixel electrode comprises a first main electrode parallel to the data line;
   a sub-pixel electrode disposed in the sub-pixel region, wherein the sub-pixel electrode comprises a second main electrode parallel to the data line;
   a main pixel thin film transistor, wherein a gate of the main thin film transistor is electrically connected to the scan line, a source of the main thin film transistor is electrically connected to the data line, and a drain of the main thin film transistor is electrically connected to the main pixel electrode;
   a sub-pixel thin film transistor, wherein a gate of the sub-pixel thin film transistor is electrically connected to the scan line, a source of the sub-pixel thin film transistor is electrically connected to the data line, and a drain of the sub-pixel thin film transistor is electrically connected to the sub-pixel electrode; and
   a sharing thin film transistor, wherein a gate of the sharing thin film transistor is electrically connected to the scan line, a source of the sharing thin film transistor is electrically connected to the drain of the sub-pixel thin film transistor, and a drain of the sharing thin film transistor is electrically connected to the second sharing line.

6. The array substrate according to claim 5, wherein each of the pixel units further comprises:
   a third sharing line, wherein one end of the third sharing line is electrically connected to the second sharing line and another end of the third sharing line extends along the first central axis from the sub-pixel region of one of the pixel units to the main pixel region of an adjacent pixel unit.

7. The array substrate according to claim 5, each of the pixel units further comprises:
   a second common line, one end of the second common line is electrically connected to the first common line and another end of the second common line extends along the first central axis from the main pixel region of one of the pixel units to the sub-pixel region of an adjacent pixel unit.

8. The array substrate according to claim 6, wherein the third sharing line in the main pixel region is disposed corresponding to the first main electrode, and the third sharing line in the sub-pixel region is disposed corresponding to the second main electrode.

9. A display panel, comprising an array substrate, a color film substrate disposed corresponding to the array substrate, and a liquid crystal layer disposed between the array substrate and the color film substrate;

wherein the array substrate comprises a substrate and a plurality of pixel units is arranged on the substrate in array;

each of the pixel units comprises:

a data line disposed on the substrate;

a scan line disposed on the substrate and intersecting with the data line; and a first sharing line disposed between the substrate and the data line and parallel to the data line, wherein the first sharing line has a first central axis parallel to the data line; the data line has a second central axis parallel to the first sharing line; and the first central axis and the second central axis coincide with each other.

10. The display panel according to claim 9, wherein a width of the first sharing line and a width of the data line are uniformly set, and the width of the first sharing line is greater than or equal to the width of the data line.

11. The display panel according to claim 9, wherein each of the pixel units is divided into a main pixel region and a sub-pixel region, and the scan line is disposed between the main pixel region and the sub-pixel region;

each of the pixel units further comprises:

a second sharing line parallel to the scan line and disposed between the scan line and the sub-pixel region; and a first common line parallel to the scan line and disposed between the scan line and the main pixel region;

wherein one end of each first sharing line is electrically connected to the second sharing line, and another end of the first sharing line extends along the first central axis from the sub-pixel region of one of the pixel units to the main pixel region of an adjacent pixel unit.

12. The display panel according to claim 11, wherein the scan line, the second sharing line, the first common line, and the first sharing line are disposed in a same layer.

13. The display panel according to claim 11, wherein each of the pixel units further comprises:

a main pixel electrode disposed in the main pixel region, wherein the main pixel electrode comprises a first main electrode parallel to the data line;

a sub-pixel electrode disposed in the sub-pixel region, wherein the sub-pixel electrode comprises a second main electrode parallel to the data line;

a main pixel thin film transistor, wherein a gate of the main thin film transistor is electrically connected to the scan line, a source of the main thin film transistor is electrically connected to the data line, and a drain of the main thin film transistor is electrically connected to the main pixel electrode;

a sub-pixel thin film transistor, wherein a gate of the sub-pixel thin film transistor is electrically connected to the scan line, a source of the sub-pixel thin film transistor is electrically connected to the data line, and a drain of the sub-pixel thin film transistor is electrically connected to the sub-pixel electrode; and a sharing thin film transistor, wherein a gate of the sharing thin film transistor is electrically connected to the scan line, a source of the sharing thin film transistor is electrically connected to the drain of the sub-pixel thin film transistor, and a drain of the sharing thin film transistor is electrically connected to the second sharing line.

14. The display panel according to claim 13, wherein each of the pixel units further comprises:

a third sharing line, wherein one end of the third sharing line is electrically connected to the second sharing line and another end of the third sharing line extends along the first central axis from the sub-pixel region of one of the pixel units to the main pixel region of an adjacent pixel unit.

15. The display panel according to claim 13, each of the pixel units further comprises:

a second common line, one end of the second common line is electrically connected to the first common line and another end of the second common line extends along the first central axis from the main pixel region of one of the pixel units to the sub-pixel region of an adjacent pixel unit.

16. The display panel according to claim 14, wherein the third sharing line in the main pixel region is disposed corresponding to the first main electrode, and the third sharing line in the sub-pixel region is disposed corresponding to the second main electrode.

* * * * *